Nov. 17, 1964     D. STRACHAN     3,156,986
EDUCATIONAL APPARATUS FOR SIMULATING
ATOMIC AND MOLECULAR MODELS

Filed June 24, 1963     3 Sheets—Sheet 1

INVENTOR.
DORA STRACHAN

BY *Douglas*   Attorney

Nov. 17, 1964

D. STRACHAN 3,156,986

EDUCATIONAL APPARATUS FOR SIMULATING
ATOMIC AND MOLECULAR MODELS

Filed June 24, 1963

INVENTOR.
DORA STRACHAN

BY

Attorney

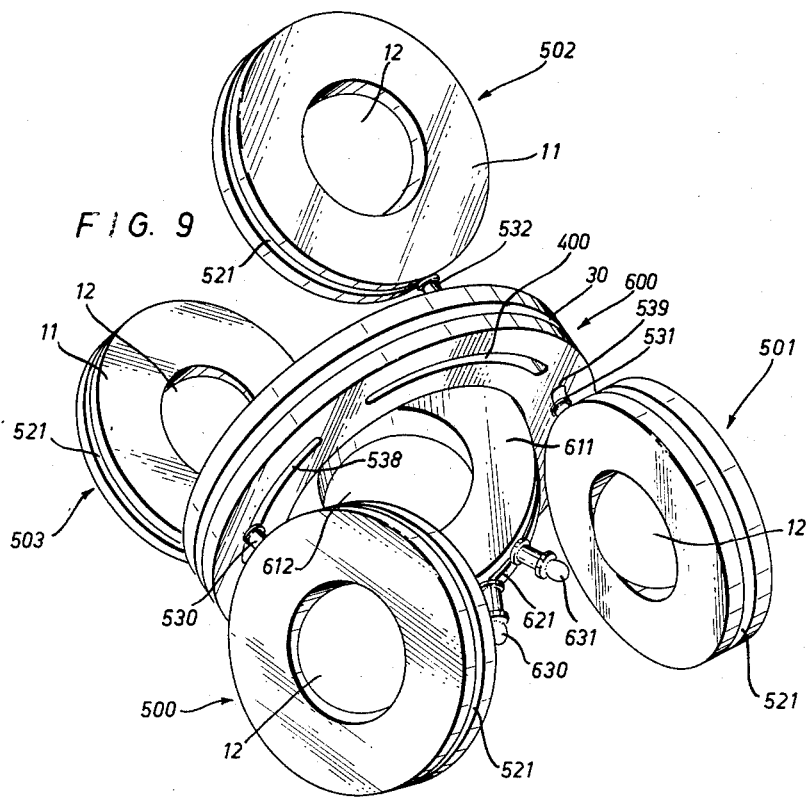
FIG. 9
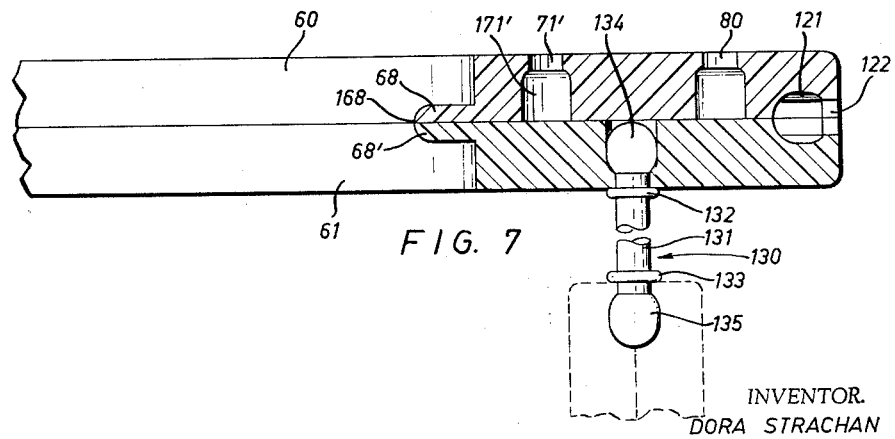
FIG. 7
INVENTOR.
DORA STRACHAN
BY 
Attorney 3,156,986
EDUCATIONAL APPARATUS FOR SIMULATING ATOMIC AND MOLECULAR MODELS
Dora Strachan, Richmond Hill, Ontario, Canada, assignor to Atom Craft, Inc., New York, N.Y.
Filed June 24, 1963, Ser. No. 290,032
7 Claims. (Cl. 35—18)

This invention relates to educational devices for illustrating the atomic and molecular structure of matter and more particularly to such models as illustrate the structure of the molecules and their component elements.

Many varied attempts have been made to provide atomic and molecular models for illustrating their structure to students. Some models have been produced which illustrate molecular structure but these are generally limited in their application to more complex molecules and in many instances only serve to confuse rather than clarify atomic and molecular structure for the student. Other models have been provided which illustrate atomic structure as distinct from molecular structure and these models do not lend themselves to illustrating molecular structure in view of the complex structures which result. In many of these latter models the individual atoms are represented by spheres of varying colours or sizes and these structures are misleading since the atomic structure is not illustrated except as to relative size and the bonds effected by the various atoms are required to be indicated by distinct elements.

Quite apart from these difficulties, a great number of components are required to illustrate all elements of the Periodic Table with consequent expensive production costs.

It is accordingly the main object of this present invention to provide an improved educational device for illustrating both atomic and molecular structure.

It is another object of this present invention to provide an improved educational device for illustrating both atomic and molecular structure which is simple to produce and comprehend.

To accomplish these various objects, the inventor provides a set of members which may be assembled to illustrate one or more of any of the atoms of the Periodic Table and these models may be combined with other models to represent any selected molecular structure. Briefly, the present invention comprises a plurality of nucleic models each of which is of substantially equal volume so that any atomic nucleus may be represented by any nucleic model. It is well settled that the differences in volume between nuclei are substantially indistinguishable; the mass varying according to the nucleus.

About the selected nucleus a member or a plurality of members of increasing size are secured in succession to represent the K, L, M, N, O and P shells of the respective elements of the Periodic Table. Each of these shells is in turn provided with means representing the various energy levels of the respective shells to which or by which means members representing the electrons present in each shell and at each energy level may be secured. In this manner, each individual atom may be built up and even the most complex molecules simulated in space. Other features and objects of the present invention become apparent from the following description and drawings which illustrate a preferred embodiment and in which:

FIGURE 2b is a side view of the model of FIGURE 2a;

FIGURE 3b is a side view of the model of FIGURE 3a;

FIGURE 4b is a side view of the model of FIGURE 4a;

FIGURE 5b is a side view of the model illustrated in FIGURE 5a;

FIGURE 6b is a side view of the model illustrated in FIGURE 6a;

FIGURE 7 is a section taken along line 7—7 of FIGURE 6a and also serves to illustrate the structure of an electron model in accordance with the present invention;

FIGURE 9 is a perspective view of a model of a molecule of methane in accordance with the present invention.

It is generally believed that an atom comprises a nucleus about which an electron or a plurality of electrons orbit and these electrons are arranged about the nucleus in a very specific way which characterizes the atom and imparts to it its particular physical and chemical properties. It is also believed that the electrons are distributed in what are called shells so that the elements of the first Period have one shell, the K, shell, surrounding the nucleus; the elements of the second Period have two shells, the K and L shells, and the elements of the third, fourth, fifth, sixth and seventh Period have K, L, and M; K, L, M and N: K, L, M, N, and O; K, L, M, N, O, and P; and K, L, M, N, O, P and Q shells, respectively. It is also believed that the capacities of the electrons in these various shells vary according to a simple series so that the K, L, M, N, O, P and Q shells are capable of accommodating 2, 8, 18, 32, 50, 72 and 98 electrons respectively. These shells are believed to define ever increasing orbits and it is believed that beyond the first or K shell, there are subshells or various levels of energy in the several principal shells and that these subshells can accommodate electrons having similar quantities of energy. The electrons in the shells closer to the nucleus are generally considered as having increased energy with respect to those shells which are disposed at a greater distance from the nucleus. The K shell is believed to have but one energy level and for convenience, the electrons of the K shell are identified by the letter $s$. The L shell is believed to have electrons at at least two energy levels and these are identified as the $s$ and $p$ shells. The M shell is believed to have three energy levels, the $s$, $p$ and $d$ levels, and the M, N, O, P and Q shells are each believed to have four energy levels, the $s$, $p$, $d$ and $f$ levels.

It is essential that the student should not only be provided with models which illustrate the various forms of bonds which may be effected between atoms to produce molecules, but also that the structure of the atoms themselves be illustrated to highlight the properties which flow from the distribution of electrons in the atoms themselves.

Figure 1:
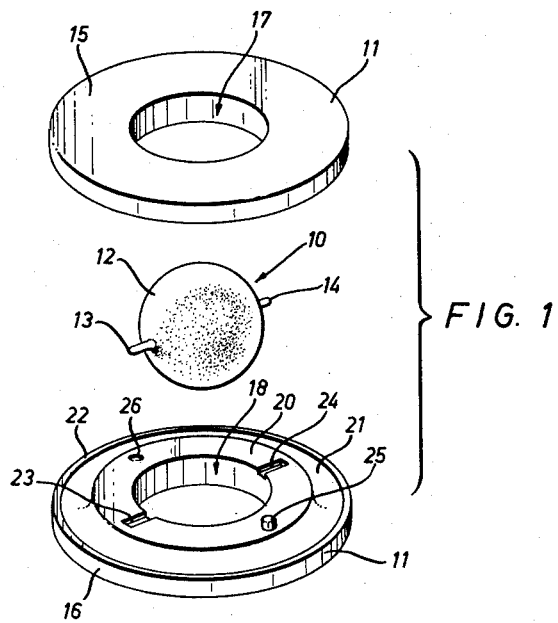
FIGURE 1 is an exploded perspective view of an atomic nucleus and a model of an electron shell of an element of the first Period.

Referring now to the drawings, in FIGURE 1, an exploded view of a nucleus 10 and a first or K shell 11 is illustrated. The nucleus comprises a sphere 12 from which a pair of diametrically opposed pins 13 and 14 project radially. The K shell 11 comprises two substantially identical half shells 15 and 16.

As will be observed from the drawings, half shells 15 and 16 have an annular form with central holes 17 and 18, respectively. About the central hole 18 is a platform 20 surrounded by a groove 21 which is bounded on its outside by a peripheral platform 22 of reduced height with respect to the central platform 20. In platform 20, a pair of diametrically opposed recesses 23 and 24 are provided which open into the central hole 18. And on the upper surface of platform 20 an upstanding pin 25 is provided, together with a diametrically opposed socket 26. Half shell 15 is of substantially identical construction so that when assembling an atom of the first Period, the student places the projections 13 and 14 of nucleus 12 in recesses 23 and 24 and then places half shell 15 over half shell 16 so that the corresponding pin and sockets thereon will be engaged by pin 25 and socket 26 of half shell 16 and the two half shells may be secured by an adhesive. Half shell 15 has a groove therein corresponding to groove 21 and the peripheral platform having a depth reduced with respect to its corresponding central platform so that the corresponding grooves 21 will define a channel which opens to the exterior of the shell through a reduced throat portion as indicated by channel 121 and reduced throat 122 of FIGURE 7.

The K shell which has just been described is preferably of high impact styrene and the nucleic model 12 of polyethelene. To represent the electrons of the atoms of this group and the atoms of the subsequent periods, pins are provided which pins have a central rod portion such as 131 of pin 130 as illustrated in FIGURE 7, a pair of collars such as 132 and 133 disposed adjacent the ends of the rod portion 131, and a pair of pin heads such as 134 and 135 disposed one at each end of the said pins. Channel 121 is dimensioned to receive pin heads such as 134 and 135 as illustrated in FIGURE 7 and hold such pin heads securely. The reduced throat 122 is of substantially the same diameter as the rod portion 131. These pins are also of polyethelene and the dimensions such that their heads may be press fitted into channels such as 122 through grooves such as 122.

Figure 2A:
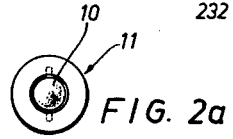
FIGURE 2a is a plan view of the assembled structure of FIGURE 1.
Figure 2B:
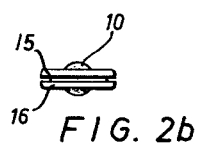

FIGURES 2a and 2b illustrate the respective plan and side views of the structure illustrated in FIGURE 1 when assembled.

When electron members such as 130 are secured in groove 121 of the K shell illustrated in FIGURE 1 and FIGURES 2a and 2b, these electrons will symbolize or simulate the s level electrons of the first Period and their bonds.

Figure 3A:
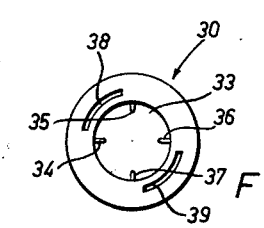
FIGURE 3a is a plan view of a model of an electron shell of an element of the second Period.
Figure 3B:
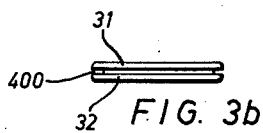

FIGURES 3a and 3b represent respectively, plan and side views of an L electron shell which is generally designated at 30. Shell 30 comprises two half shells 31 and 32 of substantially similar construction to the shell illustrated in FIGURE 8. When assembled, shell 30 comprises an annular ring having a central hole 33, into which four spaced apart projections such as 34, 35, 36 and 37 extend inwardly. On the upper surface of half shell 31, a pair of circumferentially spaced apart arcuate channels 38 and 39 are provided and on the corresponding lower half shell 32, similar channels are provided. These channels extend through half shell 32 from the upper to the lower surface thereof. The mating half shell 32 has similar channels. As with the K shell structure, the peripheral walls of these half shells are of reduced depth and are bounded on their inner sides by a channel. Again, a similar pin and socket arrangement is provided to effect engagement between the shells. To mate these shells, they are placed in superposed relationship and one shell rotated through 45° so that the corresponding channels are no longer aligned, but the sockets and pins are aligned. The peripheral channels and reduced walls will provide a peripheral channel opening to the exterior through a reduced throat.

Reference will now be made to FIGURES 6a, 6b, 7 and 8 which simulate the O shell of an atom or a molecule. The structures illustrated in FIGURES 4a and 4b simulate the M shell and the structures illustrated in FIGURES 5a and 5b simulate the N shell and are essentially identical to the O shell structure except in the number of grooves provided to simulate the various energy levels, and in this respect, the O and N shells are essentially identical except that the internal diameter of the O shell is such that it exceeds the external diameter of the N shell.

Figure 8:
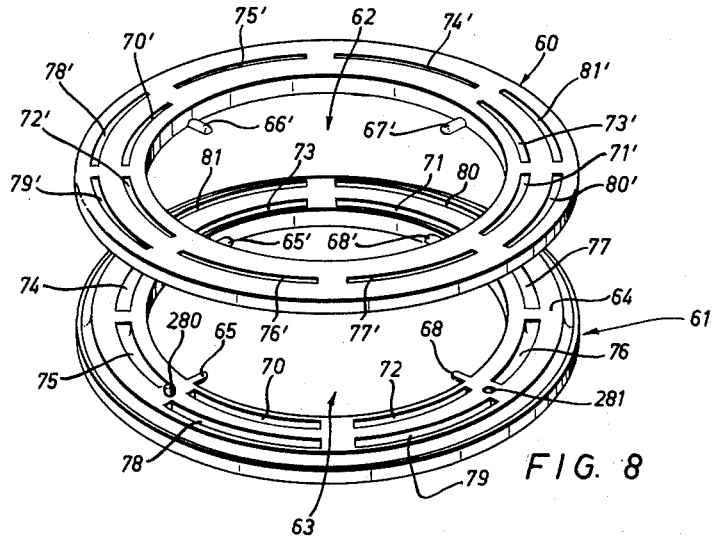
FIGURE 8 is an exploded view of the model of the electron shell illustrated in FIGURES 6a and 6b.
Figure 6A:
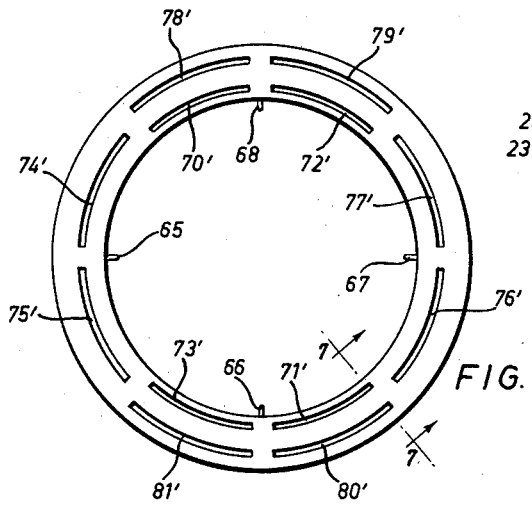
FIGURE 6a is a plan view of a model of an electron shell of the fifth, sixth or seventh Periods.
Figure 6B:

As illustrated in FIGURE 8, the O shell of FIGURES 6a and 6b comprises a pair of identical half shells 60 and 61 having a generally annular form and each having a central hole 62 and 63. About central hole 63, as about hole 62 of half shell 60, a platform 64 is provided from which four radially spaced projections extend inwardly. These projections are indicated at 65, 66, 67 and 68 and each has a flat upper surface coincident with the upper surface of platform 64. On the upper surface two series of keys and sockets are provided, the key of the first series is indicated at 280 and the socket at 281. The socket corresponding to key 280 is diametrically opposed thereto as is the key of socket 281. Half shell 60 has an identical arrangement so that the two half shells are essentially identical. These keys and sockets engage in a press fit and thus hold the two half shells securely together when engaged.

On platform 64, a first series of channels indicated by numerals 70, 71, 72 and 73 are provided. These channels represent the $s$ energy level.

External to this first series of channels, a second series staggered relative to the first series and comprising channels 74, 75, 76 and 77 are provided. These slots represent the $p$ energy level. Externally to the second series of channels again and staggered with respect to said series, a third series of channels indicated by the numerals 78, 79, 80 and 81 are provided. This latter series of channels represents the $d$ energy level of the electrons. As with the K shell 11, a groove 121 is provided adjacent the periphery of half shells 60 and 61. Again, the peripheral wall of half shells 60 and 61 are reduced with respect to the height of the central platform 64 so that channel 121 opens through a reduced throat 122 to the exterior. Channel 121 represents the $f$ energy level.

The corresponding channels on half shell 60 are indicated by prime numbers and when mated, will be staggered with respect to the corresponding channels on half shell 61.

As will be seen from FIGURE 7, the inwardly extending projections 65, 66, 67 and 68 form with the corresponding projections on upper half shell 60, a projection such as 168 illustrated in FIGURE 7. It will be noticed that the channels such as 71' have reduced throats opening out on their oppositely facing surfaces to communicate with the wider channel portions such as 171'. These channel portions 171' are dimensioned to receive the heads 134 of the electron members 130. As mentioned previously, the electron members 130 are preferably of polyethelene which is compressible and accordingly the head 134 may be inserted under pressure through the external openings 71' and upon entry of the chambers 171 will expand to hold the electron member 130 in secure engagement. Each of the channels of each of the other half shells of this invention, is similarly fashioned so that the electron pins will be similarly held thereby.

Figure 5A:
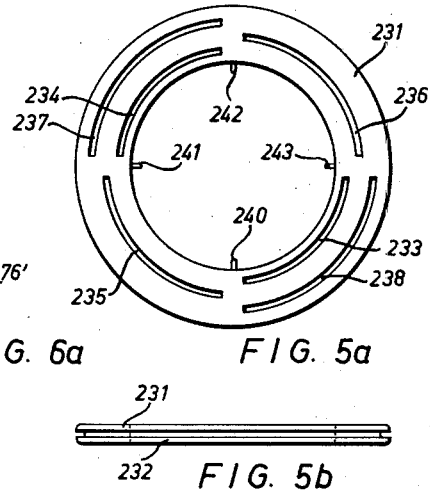
FIGURE 5a is a plan view of a model of an electron shell of an element of the fourth Period.
Figure 5B:

The N shell as illustrated in FIGURES 5a and 5b is of similar construction to the O shell described previously with reference to FIGURES 6a, 6b, 7 and 8. It comprises a pair of half shells 231 and 232 of substantially the same construction as the O shell, with the $s$ level channels being indicated at 234 and 233, the $p$ energy level channels are indicated at 235 and 236, the $d$ energy levels by channels 237 and 238, and the $f$ energy level by the peripheral channel.

And again, each half shell 231 and 232 is provided with corresponding projections which form the four projections 240, 241, 242 and 243.

Figure 4A:
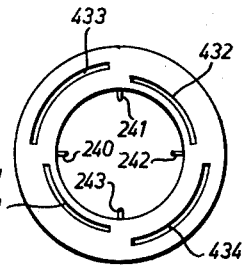
FIGURE 4a is a plan view of a model of an electron shell of an element of the third Period.
Figure 4B:
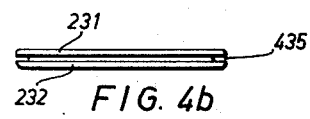

In FIGURES 4a and 4b, the M shell is depicted. Again this structure is substantially the same as the prior structures each half shell being substantially identical, but in this instance, there are three energy levels, $s$, $p$, and $d$, with $s$ level being represented by channels 431, and 432, the p level by channels 433 and 434 and the peripheral channel 435 representing the d energy level.

To assemble the structure of an atom of an element of the first period, the sphere 12 is placed so that its radial projections 13 and 14 rest in pits 23 and 24 of half shell 16 and half shell 15 is aligned with half shell 16 so that the corresponding pins and sockets therein are aligned with socket 26 and pin 25 of half shell 15. The two half shells are then pressed together and secure engagement is effected. The requisite number of electrons may then be inserted to be engaged with the peripheral channel in the manner illustrated in FIG. 9. To form an atom of the second Period, the second shell or K shell of the structure shown in FIGS. 3a and 3b, is then placed about shell 11 so that the projections 34, 35, 36 and 37 will engage with the peripheral channel 21, and into either channel 38 or 39 on the upper surface an electron pin such as 130 is inserted in the manner illustrated in FIG. 7. It is, of course, understood that the student has selected the requisite number of electron simulating pins for insertion into the s level ring of the L shell. To simulate a carbon atom, there will, of course, be two electrons such as 130 inserted into the s ring of the second shell 30, that is, in channels 38 or 39 and a further two electrons in the level of peripheral channel 400. To simulate the forms of valency which exist such as electrovalency and co-valency, different colours of pins may be employed. For example, a redheaded pin may be used to simulate an unpaired electron or a gold headed pin to represent a pair of electrons so that if one of these is used to hold two shells of different atoms together, it will simulate a co-valent bond.

In the structure illustrated in FIGURE 9, a methane molecule is illustrated, the hydrogen atoms are represented generally by the numbers 500, 501, 502 and 503, and the carbon atom by the numeral 600.

The nucleus of each of the hydrogen atoms is indicated by the numeral 12 and the K shells thereof by the numeral 11. The nucleus of the carbon atoms is indicated by the numeral 612 and the K shell by the numeral 611. In the s level channel 621 of the carbon atom K shell, a pair of electron pins 630 and 631 are secured to represent the electrons of that shell. In the s level channels of the L shell 538 and 539, electron pins 530 and 531 are inserted; these are gold headed pins, and in the p level channel, that is, the channel 400, gold headed electron pins 532 and 534 are inserted. These pins represent paired electrons, therefore, covalent bonds. The remote heads of the electron pins 532 and 534, are engaged with the peripheral channels 521 of the hydrogen atom 503 and 502 and the remote heads of s level energy electrons 530 and 531 are engaged with the channels 521 of hydrogen atoms 500 and 501 so that the bonds between the atoms are simulated. To simulate atoms of higher Periods, the inwardly projecting pins on the succeeding shells are inserted in the peripheral channels of the preceding shells and the requisite number of electrons inserted in the energy levels in accordance with the structure of the particular atom selected.

From the above, it will be obvious that almost any molecule or atom may be simulated by use of these models described and the student will be able to discern the atomic structure in any atom.

In the above specification, no description has been made of the P or Q shells, but as previously explained, these will be essentially identical to the O shell.

Whereas the invention has been described with particular reference to a preferred embodiment, it will be understood that various other modifications may be made thereto without departing from the spirit and scope of the invention except as defined in the appended claims.

What I claim is:

1. Educational apparatus for illustrating the atomic and molecular structure of matter comprising: a first member comprising a sphere having a pair of diametrically opposed outwardly extending radial projections to represent a nucleus; a second member representing a K shell, said second member having a central hole therein adapted to receive said first member, said second member comprising a pair of matingly engageable complementary annular members, each having a pair of diametrically opposed recesses opening into the central hole thereof to receive said projections of said first member and a channel adjacent the periphery thereof whereby said complementary members define a peripheral channel opening to the exterior through a reduced throat portion, and a third member representing at least one planetary electron and a force exerted thereby pressureably engageable with said peripheral channel of said second member.

2. Educational apparatus for illustrating the atomic and molecular structure of matter comprising: a first member representing a nucleus; a second member representing a K shell, said second member having a hole therein adapted to receive said first member and means adapted to secure said first member in said hole; a pair of third members, each representing at least one planetary electron and the force exerted thereby; means adapted to secure said third members to said second member; a fourth member representing an L shell, said fourth member including means to receive and secure further third members at predetermined distances from said first member to simulate the s and p energy levels thereof; and means for securing said fourth member in a surrounding relationship to the periphery of said second member, said second member comprising an annular ring-like structure having a peripheral groove, and said fourth member comprising an annular ring-like structure having an inner diameter exceeding the outer diameter of said second member and including at least a pair of projections extending inwardly from the inner surface thereof to engage said peripheral groove on said second member.

3. Educational apparatus for illustrating the atomic and molecular structure of matter comprising: a first member representing a nucleus; a second member representing a K shell, said second member having a hole therein adapted to receive said first member and means adapted to secure said first member in said hole; a pair of third members, each representing at least one planetary electron and the force exerted thereby; means adapted to secure said third members to said second member; a fourth member representing an L shell, said fourth member including means to receive and secure further third members at predetermined distances from said first member to simulate the s and p energy levels thereof; and means for securing said fourth member in a surrounding relationship to the periphery of said second member, said fourth member comprising a pair of engageably mating complementing annular members, each of said complementary members including a channel adjacent their periphery and at least one channel extending from the outer surface to the inner surface inward of the periphery thereof to represent the s energy level, said peripheral channels coacting when said members are engaged to define a peripheral channel representing the p energy level.

4. Educational apparatus as claimed in claim 1 wherein said third member comprises a pin including enlarged head portions, one disposed at either end thereof to effect pressurable engagement with said peripheral channel.

5. Apparatus as claimed in claim 3 wherein said channels extending from said outer to said inner surfaces have a reduced portion opening on to said outer surface and an enlarged portion opening on to said inner surface to enable pressurable engagement between one of said third members and said fourth members.

6. Educational apparatus for illustrating the atomic and molecular structure of matter comprising a first member representing a nucleus; a second member representing a K shell, said second member including a peripheral groove representing the s energy level thereof; third members each representing at least one planetary electron and the force exerted thereby; said third members each comprising a pin having a pair of enlarged heads one at either end thereof, a fourth member representing an L shell, a fifth member representing an M shell, said fourth and fifth members each including a predetermined number of channels including a peripheral channel corresponding to the energy levels of the respective shells, said fourth and fifth members having an annular ring-like form and a plurality of inwardly extending projections, the inner diameter of said fourth member exceeding the outer diameter of said second member, and the inner diameter of said fifth member exceeding the outer diameter of said fourth member whereby the inwardly extending projections of said fourth and fifth members may be engaged with peripheral groove of the inner adjacent members.

7. Educational apparatus as claimed in claim 6 wherein said second, fourth and fifth members each comprise a pair of substantially identical matingly complementary members each having a peripheral groove adapted to provide a peripheral channel opening to the exterior through a reduced throat portion, said third members each comprising a pin including a pair of enlarged compressible heads one at each end adapted to compressibly engage said peripheral channels.

References Cited by the Examiner
UNITED STATES PATENTS

| | | | |
|---|---|---|---|
| 2,410,874 | 11/46 | Greenberg et al. | 46—29 |
| 2,477,179 | 7/49 | Hart | 35—18 |
| 2,920,400 | 1/60 | Subluskey | 35—18 |
| 3,080,662 | 3/63 | Brumlik | 35—18 |

FOREIGN PATENTS

| | | |
|---|---|---|
| 320,788 | 5/57 | Switzerland. |
| 1,168,727 | 9/58 | France. |
| 1,214,106 | 11/59 | France. |

JEROME SCHNALL, *Primary Examiner.*